(12) United States Patent
Brandenstein et al.

(10) Patent No.: US 7,103,974 B2
(45) Date of Patent: Sep. 12, 2006

(54) PROCESS FOR MOUNTING BEARING RINGS

(75) Inventors: Manfred Brandenstein, Eussenheim (DE); Hans-Jürgen Friedrich, Königsberg (DE); Hubert Herbst, Gädheim (DE); Peter Horling, Mainberg (DE)

(73) Assignee: SKF GmbH, Schweinfurt (DE)

( * ) Notice: Subject to any disclaimer, the term of this patent is extended or adjusted under 35 U.S.C. 154(b) by 1099 days.

(21) Appl. No.: 09/920,622

(22) Filed: Aug. 3, 2001

(65) Prior Publication Data

US 2002/0021852 A1  Feb. 21, 2002

(30) Foreign Application Priority Data

Aug. 4, 2000 (DE) .................... 100 38 847

(51) Int. Cl.
*B21D 53/10* (2006.01)
(52) U.S. Cl. .............. 29/898.07; 29/898.09; 29/451
(58) Field of Classification Search ........ 29/898.07, 29/898.09, 450, 451, 505, 522.1, 523, 724, 29/725
See application file for complete search history.

(56) References Cited

U.S. PATENT DOCUMENTS

| 1,668,105 A | * | 5/1928 | Delaval-Crow et al. | . 29/898.07 |
| 1,676,171 A | * | 7/1928 | Valentine | 29/898.07 |
| 1,695,017 A | * | 12/1928 | Kuckuck | 29/898.07 |
| 2,168,227 A | * | 8/1939 | Lignian | 419/2 |
| 3,004,323 A | * | 10/1961 | Pitner | 29/898.066 |
| 3,579,780 A | | 5/1971 | Matt et al. | |
| 3,710,471 A | * | 1/1973 | Pitner | 29/898.066 |
| 5,743,015 A | * | 4/1998 | Kunze et al. | 29/898.07 |
| 6,419,398 B1 | * | 7/2002 | Murphy et al. | 384/569 |

FOREIGN PATENT DOCUMENTS

| DE | 1959336 |   | 6/1970 |
| DE | 2117018 |   | 4/1982 |
| DE | 3409247 |   | 9/1985 |
| EP | 485001 | * | 5/1992 |
| GB | 820237 | * | 9/1959 |
| GB | 1269565 | * | 4/1972 |

OTHER PUBLICATIONS

Karl Schmidt GMBH, "Trockenlager und Trockenlagerwerkstoffe", pp. 14-17.
Glacier Industrial Bearings, "DU/DU-B wartungsfrei", Technisches Handbuch, pp. 27-29.

* cited by examiner

*Primary Examiner*—Eric Compton
(74) *Attorney, Agent, or Firm*—Buchanan Ingersoll & Rooney PC (57) ABSTRACT

A process for mounting an outer bearing ring involves press fitting a stamp into the outer ring so that the inner peripheral surface of the outer ring assumes the shape of the stamp. Using the stamp, the outer ring is then press fitted into the recess of a machine part so that the contour of the external peripheral surface of the outer ring is plastically molded through axial stretching into the machine part. To mount an inner ring, a stamp with a bore is press fitted onto the inner ring so that the inner peripheral surface of the inner ring pressing against the stamp assumes the shape of the bore of the stamp. Using the stamp, the inner ring is then press fitted onto the machine part and the contour of the inner peripheral surface of the inner ring is plastically molded through axial flow forming into the machine part.

15 Claims, 7 Drawing Sheets

PROCESS FOR MOUNTING BEARING RINGS

This application is based on and claims priority under 35 U.S.C. § 119 with respect to German Application No. 100 38 847.7 filed on Aug. 4, 2000, the entire content of which is incorporated herein by reference.

FIELD OF THE INVENTION

The invention generally relates to bearing rings. More particularly, the present invention pertains to a process for mounting bearing rings having a raceway for rolling roller bodies or a bearing surface on one of their peripheral surfaces.

BACKGROUND OF THE INVENTION

The pressing of bearing rings into, for example, the bore of a bearing housing or onto a shaft is known. To ensure a secure seating of the bearing rings, the bearing rings are press fitted into the bore and/or onto the shaft with an overlap which depends on the specific requirements of the application. However, this typically involves competing concerns. On the one hand, an overlap as great as possible is desirable to produce a fixed and permanent seating of the bearing. On the other hand, an overlap as small as possible is preferable to avoid the negative consequences of press fitting, such as deformation of the bearing ring and the resulting out-of-roundness or even damage to the bearing ring and damage to the seat.

Particularly when high demands are placed on the dimensional accuracy and roundness in the region of the raceway or the bearing surface of the bearing ring, the typical method of proceeding is to first manufacture the bearing ring as precisely as possible and to then design the mounting process in such a way that the bearing ring is deformed as little as possible during mounting so that its dimensions are thus altered as little as possible. For this purpose, the bearing ring is positioned as carefully as possible on the seat that is provided for the bearing ring, for example in a housing bore or on a shaft and, if necessary, secured against creep.

Axial locking can be achieved by way of shoulders or stop faces and, for example, clamping rings or nuts provided for this purpose. However, locking the bearing ring against twisting is significantly more difficult. In principle, it is possible to use machine parts which engage with a form fit. However, this requires a relatively large outlay and thus frequently involves relatively high costs. Locking by way of fitting, which is more favorable with respect to costs and outlay, is typically only utilized for the range of smaller overlaps, because otherwise the precisely manufactured bearing rings are unacceptably deformed. This practice is thus restricted to fields of use with lower stresses.

DE 34 09 247 A1 discloses a process for producing bearing seats precisely on axes in light metal die cast parts in which needle bushings are press fit into calibrated sintered parts. Press fitting a hardened bearing bushing into a non-hardened bushing is discussed in DE 21 17 018 C2. The two-part bearing ring produced in this way is pressed with the aid of a mandrel into a matrix, with the external diameter of the bearing ring being calibrated through extrusion.

A need thus exists for a way of mounting bearing rings which is able to fulfill the very high demands for dimensional accuracy of the mounted bearing rings while at the same time ensuring durable and loadable fixing of the bearing rings.

SUMMARY OF THE INVENTION

In accordance with one aspect of the invention, a process for mounting an outer bearing ring involves press fitting a stamp into the outer ring so that the inner peripheral surface of the outer ring assumes the shape of the stamp. Using the stamp, the outer ring is then press fitted into the recess of a machine part so that the contour of the external peripheral surface of the outer ring is plastically molded through an axial flow forming process into the machine part. The stamp is then removed from the inner ring.

According to another aspect of the invention, a process for mounting an inner ring involves press fitting a stamp having a bore onto the inner ring so that the inner peripheral surface of the inner ring pressing against the stamp assumes the shape of the bore of the stamp. Using the stamp, the inner ring is then press fitted onto the machine part and the contour of the inner peripheral surface of the inner ring is plastically molded through an axial flow forming process into the machine part. The stamp is then removed.

The process for mounting bearing rings according to the present invention permits realization of very high demands for dimensional accuracy of the mounted bearing rings while also ensuring durable and loadable fixing of the bearing rings.

In contrast to previously known methods of mounting dimensionally accurate bearing rings, the process according to the invention involves press fitting the bearing rings into their seating with a large overlap. The overlap is selected in such a way that the seating is plastically deformed. Surprisingly, it is possible under these types of conditions to achieve a mounted bearing ring with very good dimensional accuracy. This is achieved in the mounting of the outer ring in that the stamp is press fitted into the outer ring and the outer ring is thereby deformed so that the inner peripheral surface of the outer ring pressing against the stamp assumes the shape of the stamp. Only then is the outer ring press fitted into the recess of the machine part with the aid of the stamp and the contour of the outer peripheral surface of the outer ring thereby plastically molded through an axial flow forming process, with the outer ring serving as the stretching tool, into the machine part. This method of proceeding has the advantage that the outer ring has a very high dimensional accuracy after mounting because, due to the plastic deformation of the machine part, it is ensured that the outer ring largely maintains the shape forced by the stamp even after removal of the stamp.

A further advantage is that the bearing rings used in the process according to the invention do not have to fulfill the tolerances required for the bearing rings in their mounted state. This means that mounting processes according to the invention lead to an improvement of the dimensional accuracy of the outer rings. In contrast, known mounting processes generally lead to worsening of dimensional accuracy. Because the requirements for the bearing rings used are thus lower, they can be produced faster and more economically. A further advantage is that a very solid seat can be realized through the process according to the invention. Advantages similar to those mentioned above also apply in an analogous way for the process that is used to mount the inner bearing rings.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 3b is an enlarged cross-sectional view of a portion of the outer ring shown in FIG. 3a;

FIG. 6b is an enlarged cross-sectional view of a portion of the inner ring shown in FIG. 6a.

DETAILED DESCRIPTION OF THE INVENTION

FIGS. 1a–1d schematically illustrate the course of the process according to an embodiment of the present invention for mounting an outer ring. These illustrations represent four snapshots during the process and are illustrated very schematically. The four representations do not necessarily correspond with any time cycle possibly present during the course of the production process.

Referring initially to FIG. 1, a machine part 2 possesses a bore or boring 3 that is adapted to receive the outer ring 1. In the illustration according to FIG. 1a, the outer ring is outside the boring 3, i.e., the outer ring 1 is shown in the unmounted state. An inner peripheral surface 4 of the outer ring 1 is designed as a raceway for rolling roller bodies or as a bearing surface. The outer peripheral surface 5 of the outer ring 1 forms a seat which, after mounting, presses against the wall 6 of the boring 3.

Figure 1A:
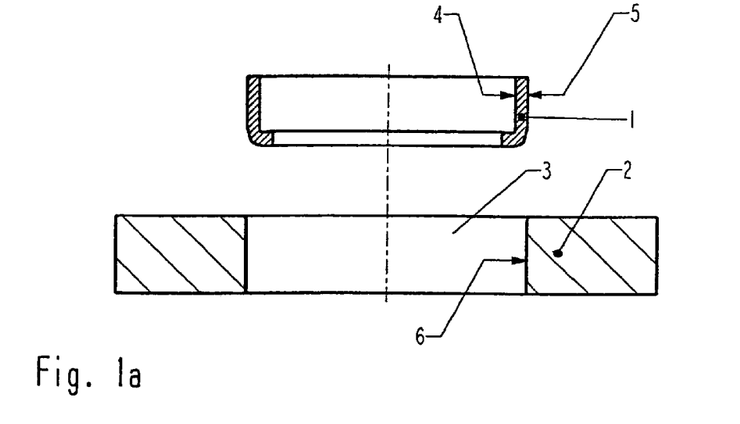
FIGS. 1a–1d are cross-sectional views of an outer ring and machine part schematically illustrating the process according to the present invention for mounting an outer ring.
Figure 1B:
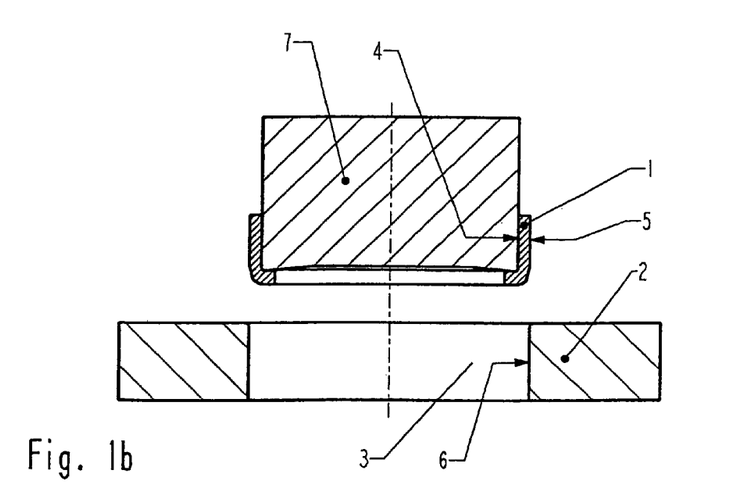

As shown in FIG. 1b, a cylinder-shaped stamp 7 is press fitted into the outer ring 1 during an initial portion of the process. The stamp 7 is very precisely manufactured and therefore represents a nearly perfect cylinder. This cylindrical shape of the stamp 7 is transferred to the inner peripheral surface 4 of the outer ring 1 when the stamp 7 is press fitted into the outer ring 1. The press fit occurs with a certain overlap between the stamp 7 and the outer ring 1 so that, as a general rule, an elastic deformation of the outer ring 1 occurs. As a result, the inner peripheral surface 4 of the outer ring 1 presses substantially precisely against the cylinder surface of the stamp 7. The internal diameter of the outer ring 1 is thereby brought to a desired dimension through the press fitting of the stamp 7 into the outer ring 1. Furthermore, possibly existing out-of-round portions on the inner peripheral surface 4 of the outer ring 1 are strongly reduced or substantially eliminated.

In the absence of additional measures being taken, the advantageous effects mentioned might not be fully realized or might be canceled out upon removal of the stamp 7 from the outer ring 1, insofar as the outer ring 1 is elastically deformed. Suitable countermeasures for inhibiting or substantially preventing the outer ring 1 from springing back into its initial position are thus preferably implemented in the further course of the process according to the present invention.

Figure 1C:
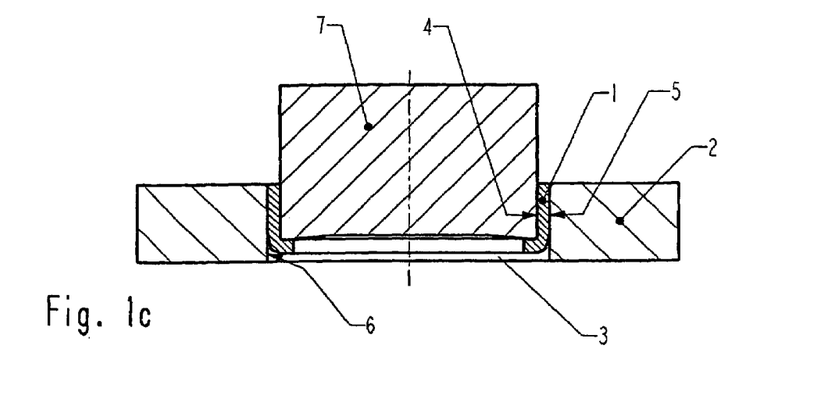

After the stamp 7 is press fitted into the outer ring 1, the outer ring 1 is press fitted, by way of the stamp 7 which is located in the outer ring 1, up to a predetermined position in the bore 3 of the machine part 2. This is illustrated in FIG. 1c. In the course of press fitting the outer ring 1 into the machine part 2, it is important that a plastic deformation of the machine part 2 occur. During this plastic deformation, the machine part 2 fits or shapes itself, in the region of the wall 6 of the bore 3, to the contour of the outer peripheral surface 5 of the outer ring 1 and does so permanently. It is not necessary that the outer peripheral surface 5 of the outer ring 1 have a very exact cylindrical shape.

The plastic deformation that occurs is an axial flow forming process in which the external ring 1 serves as the stretching or axial flow forming tool. During the axial flow forming, the material of the machine part 2 is compressed and possibly also displaced. The material compression is important from the standpoint of permanently obtaining the cylindrical shape of the external ring 1 optimized with the aid of the stamp 7. Simple press fitting of the external ring 1 into the machine part 2 without stretching or flow forming is typically insufficient to force the inner peripheral surface 4 of the outer ring 1 into a highly precise cylindrical shape permanently.

It is important that the outer ring 1 be press fitted into the bore 3 of the machine part with a certain overlap (radial overlap) so that the plastic deformation of the machine part 2 can occur. Generally speaking, an overlap of at least 100 μm provides very good results in this regard. More specifically, an overlap is selected which corresponds or is equal to the size of the maximum wall thickness eccentricity on the upstanding outer peripheral surface 5 of the outer ring 1 plus a value of at least 50 μm. The maximum wall thickness eccentricity is defined herein as the difference between the largest and the smallest local radius in the cylindrically shaped region of the outer peripheral surface 5 of the outer ring 1, after the stamp 7 has been press fit. As a general rule, the maximum wall thickness eccentricity is approximately 60 μm and so a typical radial overlap of about 110 μm or more is selected. The overlap values mentioned above are significantly more than is used for a typical press fit.

In addition, the material of the outer ring 1 and the material of the machine part 2 should be tailored to one another in such a way that the machine part 2, and not the outer ring 1, is plastically deformed. This can be achieved by selecting a harder material for the outer ring 1 than for the machine part 2.

Further, the geometry, particularly that of the outer ring 1, is of significance. The outer ring 1 should be implemented in the region in which it touches the machine part 2 as it is being press fit in such a way that material wear does not occur (e.g., through abrasion), but rather the machine part 2 is deformed. In this context, for example, sharp angles should be avoided and the outer peripheral surface 5 of the outer ring 1 is to be implemented on the side facing the machine part 2 as it is being press fit in such a way that pressure conduction is possible from the outer ring 1 into the machine part 2, which is favorable for the desired plastic deformation of the machine part 2. This geometry will be discussed below with reference to the illustrations in FIGS. 3a and 3b.

Figure 1D:
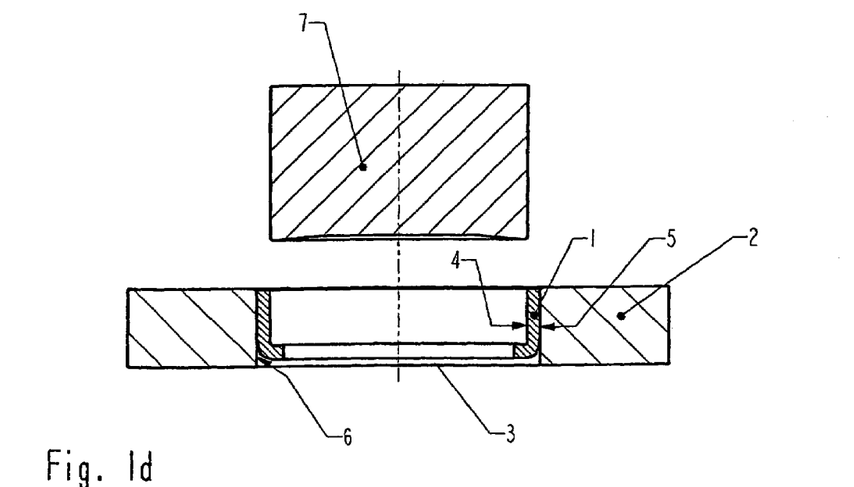

In a further aspect of the process which is shown in FIG. 1d, the stamp 7 is removed from the outer ring 1, with the outer ring 1 remaining in the bore 3 of the machine part 2.

Due to the tensions produced as the stamp 7 is press fitted into the outer ring 1, the outer ring 1 will attempt to spring back into its original shape. However, this is prevented in that the outer peripheral surface of the outer ring 1 presses firmly against the wall 6 of the bore 3 and is thus unable to deform. The cylindrical shape that is stamped into the inner peripheral surface 4 of the outer ring 1 by the stamp 7 is thus largely maintained even after the stamp 7 is removed. As a result, the outer ring I has a nearly perfectly cylindrical inner peripheral surface 4 in its mounted state and therefore also possesses a highly precise raceway or bearing surface. Further, a very solid seating of the outer ring 1 in the bore 3 of the machine part 2 which also durably bears high stresses is achieved by the mounting process.

Figure 2A:
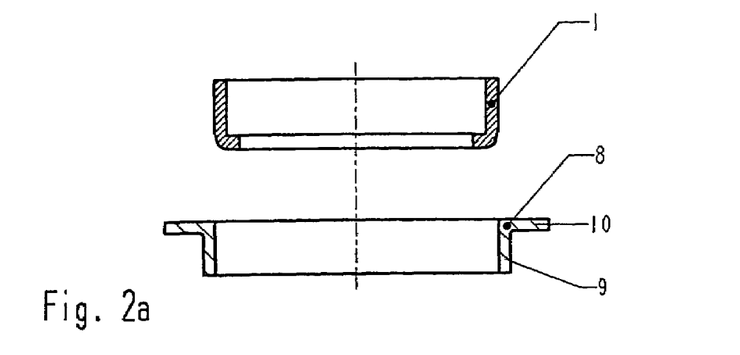
FIGS. 2a–2d are cross-sectional views of an outer ring and machine part schematically illustrating an alternative process for mounting the outer ring in accordance with the present invention.

FIGS. 2a–2d illustrate an alternative process that can be carried out, adjusted with respect to use in thin-walled machine parts. FIG. 2a illustrates the outer ring 1 and a thin-walled machine part, for example a bearing bracket 8, in an unmounted state. The bearing bracket 8 consists of a hollow cylindrical region 9 and a flange 10 directed radially outward.

Figure 2B:
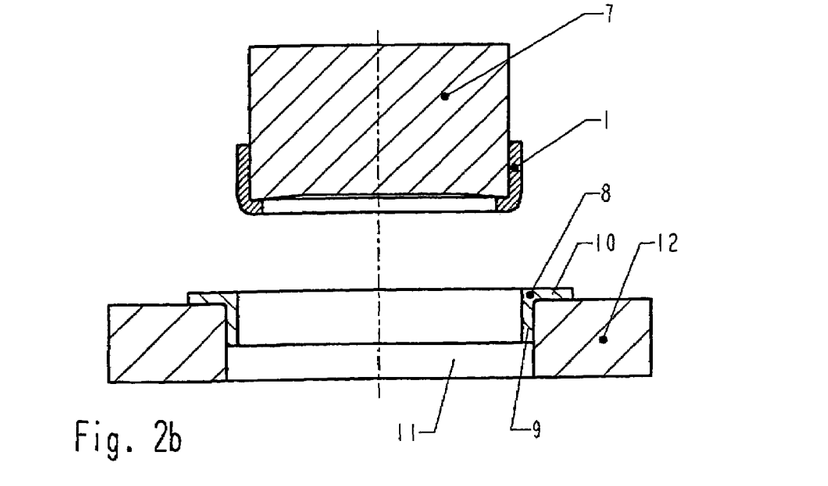

As illustrated in FIG. 2b, the stamp 7 is press fitted into the outer ring 1 in a manner similar to that described above in connection with FIG. 1b. Furthermore, the bearing bracket 8 has a hollow cylindrical portion 9 that is inserted into a bore or boring 11 of a matrix 12 (or the matrix 12 is pushed onto the cylindrical portion so that the bore 11 receives the matrix 12) until the flange 10 of the bearing bracket 8 presses against the matrix 12. As in the embodiment described above in connection with FIGS. 1a–1d, this embodiment involves the stamp 7 being press fitted into the outer ring 1 with an overlap. The bearing bracket 8 is inserted into the matrix 12 tightly, but without overlap, or with a relatively slight overlap, so that the bearing bracket is deformed as little as possible.

Figure 2C:
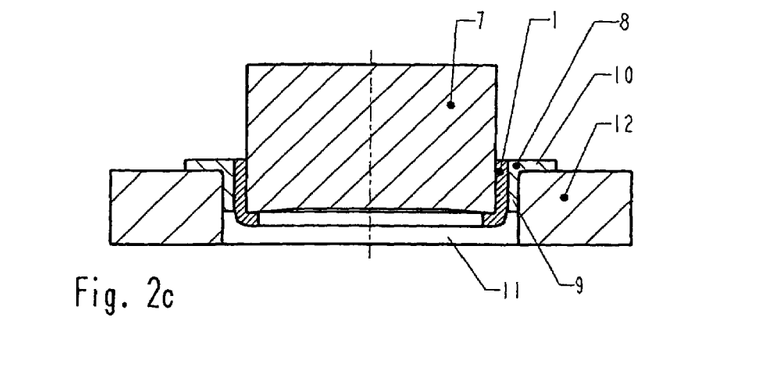

Subsequently, as shown in FIG. 2c, the outer ring 1 is press fitted into the bearing bracket 8 with the aid of the stamp 7. In a manner similar to that described above in connection with the version of the invention shown in FIG. 1c, the outer ring 1 and the machine part (i.e., the bearing bracket 8) are configured or dimensioned so that a large overlap exists between the outer ring 1 and the machine part so that a plastic deformation of the bearing bracket 8 occurs by virtue of an axial flow forming process due to the outer ring 1. Only limited outward radial spreading of the bearing bracket 8 is possible because the bearing bracket 8 is supported in the radially outward direction on the matrix 12. This overlap is preferably the same as that described above in connection with the version of the invention shown in FIGS. 1a–d. That is, the radial overlap should be at least 100 μm, or can depend on the maximum wall thickness eccentricity of the outer ring 1 (i.e., the overlap is at least equal to the maximum wall thickness eccentricity (typically approximately 60 μm) plus at least 50 μm).

Figure 2D:
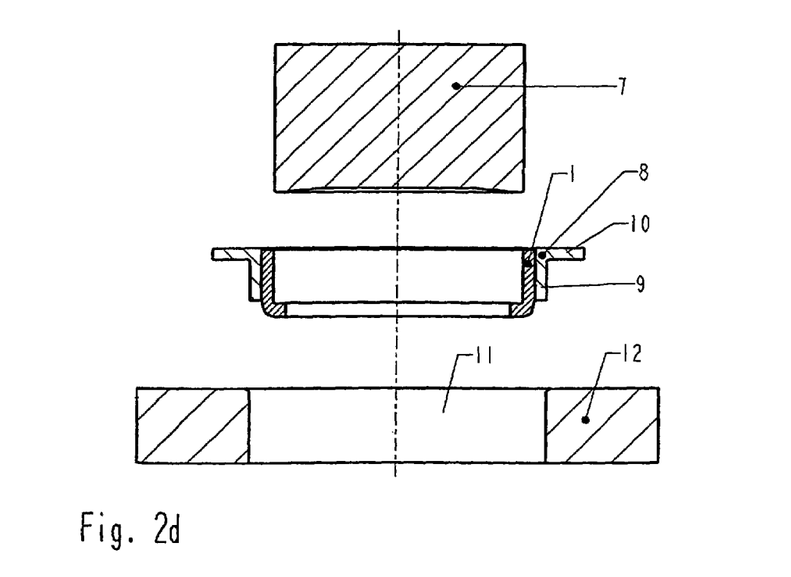

After the press fit procedure is finished, the stamp 7 is removed from the outer ring 1 and the bearing bracket 8 is taken out of the matrix 12 as illustrated in FIG. 2d. The bearing bracket 8 can then be mounted in the installation environment which is provided for it, with assembly with the remaining bearing components possibly previously occurring in a known way.

Figure 3A:
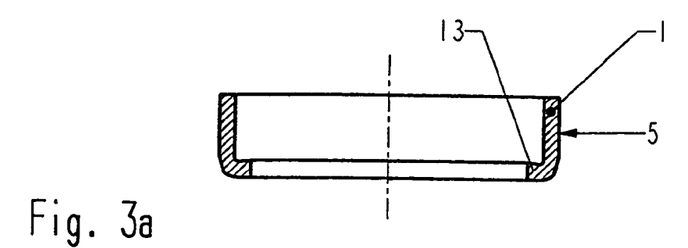
FIG. 3a is a cross-sectional view of the outer ring according to the present invention.
Figure 3B:
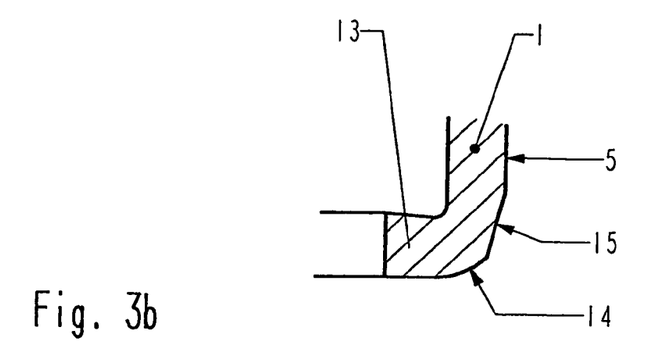

FIG. 3a shows the outer ring according to the invention in cross-section while FIG. 3b shows an enlarged cross-section of a portion of the outer ring. By way of example, an outer ring 1 is depicted as having a flange 13 directed inward on one axial end. The outer ring 1 is implemented in such a way that it is mounted with the axial side on which the flange 13 is provided press fitted into the machine part 2 or the bearing bracket 8 first.

To facilitate the plastic deformation of the machine part 2 or the bearing bracket 8 desired during the press fitting process, the diameter of the outer peripheral surface 5 of the outer ring 1 decreases toward the face on which the flange 13 is provided. The configuration illustrated in the enlarged detailed illustration in FIG. 3b has been found to be particularly favorable. In this embodiment, the outer periphery of the outer ring 1 is configured in the transition region to the end face that is provided with the flange 13 as a convex surface portion 14. Thus, in this region, the outer periphery of the outer ring transitions continuously into the outer side of the flange 13. A conical section 15 adjoins the convex surface portion 14. Within this conical section 15, the external diameter of the outer ring 1 continuously increases to a maximum value. The diameter remains constant at this maximum value over the remaining axial region of the outer ring, i.e., the outer peripheral surface 5 has a cylindrical shape.

Values between 7° and 15° are selected for the angle which the conical section 15 encloses with the cylindrical section of the outer peripheral surface 5 of the outer ring 1 to permit realization of the desired axial flow forming effect as the outer ring 1 is press fit. In the region of the transition between the conical shape and the cylindrical shape, the outer peripheral surface 5 can be designed with a maximum radius of 0.3 mm.

By virtue of the shaping described above, no material or only a small amount of material, is abraded as the outer ring 1 is press fitted into the machine part 2 or the bearing bracket 8. Instead, the press fitting of the outer ring 1 into the machine part 2 or the bearing bracket 8 causes deformation and/or compression of the material of the machine part 2 or the bearing bracket 8 radially outward. Depending on the application, deviations from the shaping described are also possible, with a continuous transition without edges from the outer peripheral surface 5 into the end face of the outer ring 1 generally proving to be favorable.

Figure 4:
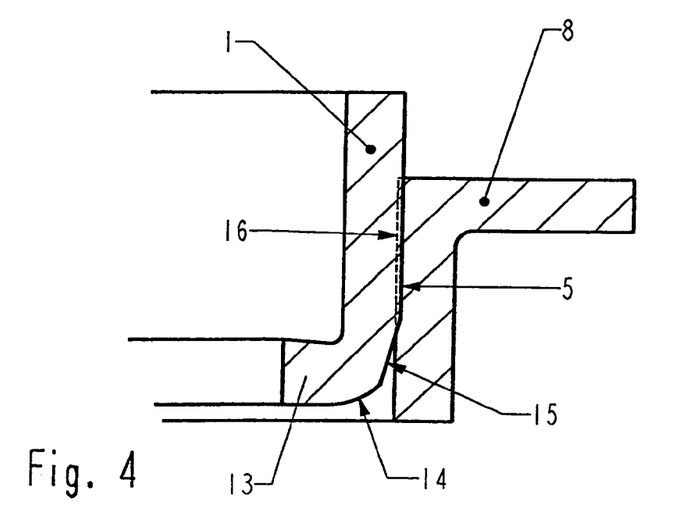
FIG. 4 is a cross-sectional view of the outer ring in the mounted state.

FIG. 4 shows an enlarged section of the outer ring in a mounted state. The illustrated example shows an outer ring 1 mounted in the bearing bracket 8. However, the relationships shown are very similar in other machine parts. The outline or configuration of the inner peripheral surface of the bearing bracket 8 before mounting of the outer ring 1 is illustrated by the dashed line 16. As can be seen, the outer ring 1 underwent practically no change in shape as it was press fitted while the material in the region of the inner peripheral surface 16 of the bearing bracket 8 was displaced radially outwardly or axially. The outer peripheral surface of the bearing bracket 8 is not changed or is changed only slightly because it presses against the matrix 12 during the press fitting process. It can also be seen from FIG. 4 that the radial displacement in the region of the conical section 15 of the outer peripheral surface 5 of the outer ring 1 is larger than the radial overlap between the outer ring 1 and the bearing bracket 8. That is, the material displacement and/or material compression as the outer ring 1 is press fitted occurs via the conical section 15.

FIGS. 5a to 5d schematically illustrate the course of the process according to an embodiment of the present invention for mounting an inner ring. Once again, it is to be understood that these illustrations represent four snapshots during the process and are illustrated very schematically. The four representations do not necessarily correspond with any time cycle possibly present during the course of the production process.

Figure 5A:
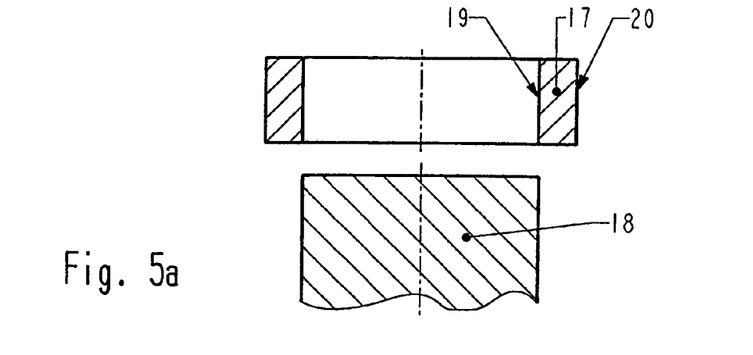
FIGS. 5a–5d are cross-sectional views of an inner ring and a shaft schematically illustrating the process according to the invention for mounting an inner ring.

In the illustrated example, an inner ring 17 is mounted on a shaft 18. The mounting of the inner ring 17 occurs, in principle, in a manner similar to the mounting of the outer ring 1. In FIG. 5*a*, the inner ring 17 and the shaft 18 are illustrated before mounting. An inner peripheral surface 19 of the inner ring 17 serves as a seat and an outer peripheral surface 20 of the inner ring serves as a bearing surface or as a raceway for rolling roller bodies.

Figure 5B:
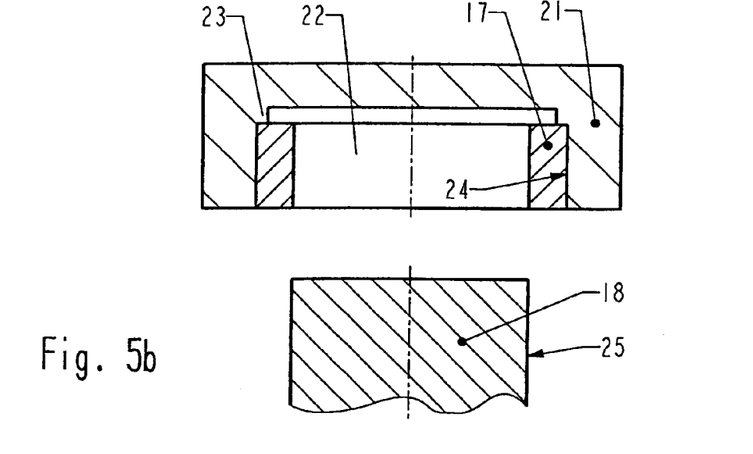

As illustrated in FIG. 5*b*, the inner ring 17 is press fitted into a hollow cylindrical stamp 21 in a first process step. A shoulder 23 around the inside of the bore or boring 22 of the stamp 21 serves as a depth stop for the press fitting process. The bore 22 of the stamp 21 is very precisely manufactured so that the wall 23 of the bore 22 represents a nearly perfect cylinder. As a consequence, the outer peripheral surface 20 of the inner ring 17 is also nearly perfectly cylindrical in its press fitted state. An overlap is selected for press fitting the inner ring 17 into the cylinder 21 which, as a rule, only leads to elastic deformation of the inner ring 17.

Figure 5C:
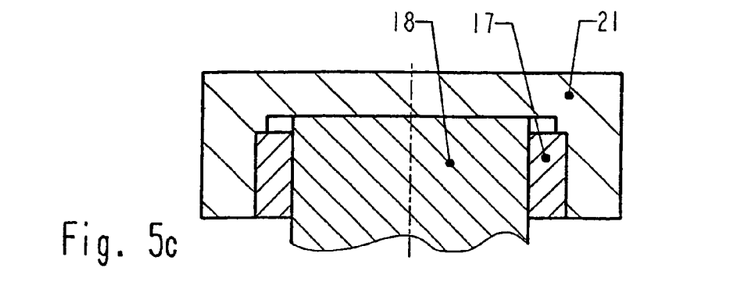

In a further process step, the inner ring 17 in the bore 22 of the stamp 21 is press fitted onto the shaft 18. For this purpose, the overlap is selected so that in the course of an axial flow forming process, a plastic deformation of the shaft 18 occurs in the region of its peripheral surface 25 which presses against the inner ring 17. The value for the overlap can be selected in a manner similar to the above-described method for the outer ring 1, with the maximum wall thickness eccentricity being based on the inner peripheral surface 19 of the inner ring 17. After this process step, the configuration illustrated in FIG. 5*c* is reached.

Figure 5D:
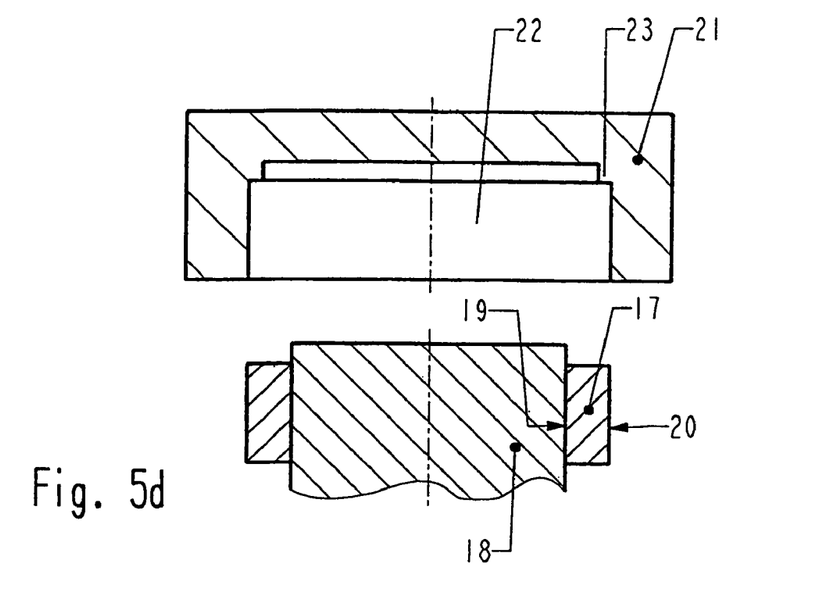

Finally, as shown in FIG. 5*d*, the stamp 21 is pulled off the inner ring 17. The inner ring 17 remains on the shaft 18 with a solid seat and a nearly perfectly cylindrical outer peripheral surface 20.

Figure 6A:
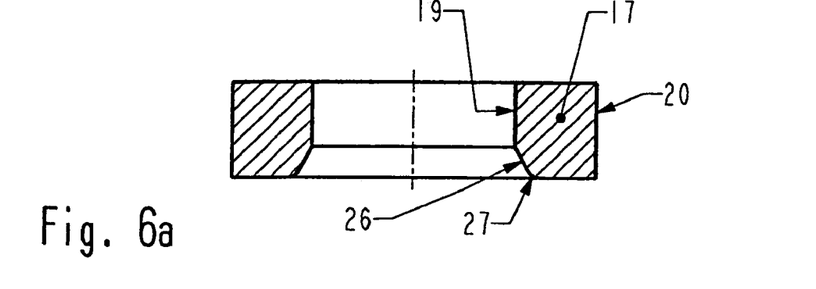
FIG. 6a is a cross-sectional view of the inner ring according to the present invention.
Figure 6B:
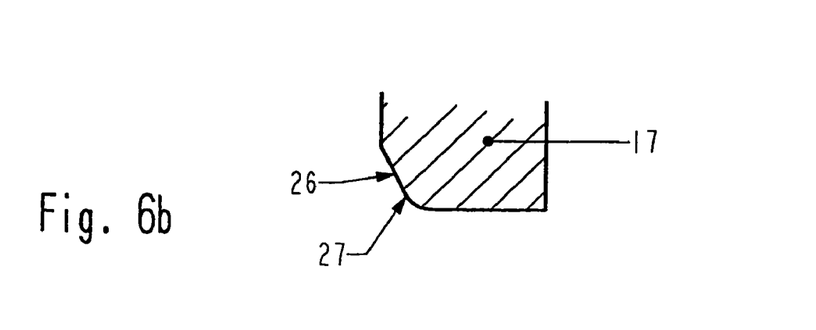

FIG. 6*a* shows the inner ring according to the invention in cross-section and FIG. 6*b* illustrates an enlarged detail of the region marked in FIG. 6*a* with a circle. The inner peripheral surface 19 of the inner ring 17 has an essentially cylindrical shape along a substantial portion of its axial extent. Near the end face of the inner ring 17 in whose direction the inner ring 17 is press fitted onto the shaft 18 or another machine part during mounting, the inner peripheral surface 19 deviates from the cylindrical shape and initially has the shape of a widening conical surface 26, which finally transitions into a convex surface 27, i.e., the internal diameter of the inner ring 17 continuously increases up to the end face. The angle between the conical surface 26 and the cylindrical region of the inner peripheral surface 19 of the inner ring 17 is between 7° and 15°, with a radius of a maximum of 0.3 mm on the inner peripheral surface 19 in the region of the transition between the conical shape 26 and the cylindrical shape.

As in the case of the outer ring 1, this shaping of the inner ring 17 serves to reinforce the plastic deformation of the machine part on which the inner ring 17 is mounted. Therefore, it is also important in the inner ring 17 that edges are avoided as much as possible in the shaping or configuration near the end face. To make the mounting more simple, the continuous transition described between the inner peripheral surface 19 and the end face of the inner ring 17 can be provided for both end faces. In this way, care does not have to be taken during mounting that the outer ring is positioned with the correct face toward the machine part.

In a variation of the present invention, the raceway or the bearing surface, respectively, of the outer ring 1 or the inner ring 17 is not cylindrical in shape, but is conical. In such an alternative, a conical stamp 7 or a stamp 21 with a conical bore 22 is used. In principle, the configuration of the stamp 7 or the bore 22 of the stamp 21 depends on the desired contour of the raceway and/or the bearing surface, i.e., on the inner peripheral surface 4 for the outer ring 1 and on the outer peripheral surface 20 for the inner ring 17.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Process for mounting an outer ring of a bearing in a recess of a machine part, the outer ring having an inner peripheral surface with a raceway for rolling rollers or with a bearing surface and an outer peripheral surface, the process comprising:
    pressing a stamp having a shape into the outer ring to deform the outer ring in such a way that the inner peripheral surface of the outer ring pressing against the stamp assumes the shape of the stamp;
    pressing the outer ring into a machine part through use of the stamp so that a contour of the outer peripheral surface of the outer ring is plastically molded into the machine part through axial flow forming of the machine part and with the outer ring serving as a stretching tool; and
    removing the stamp from the outer ring.

2. The process according to claim 1, wherein the inner peripheral surface of the outer ring substantially maintains a shape formed with the stamp after the stamp is removed.

3. The process according to claim 1, wherein the outer ring has a greater hardness than the machine part.

4. The process according to claim 1, wherein the stamp is pressed into the outer ring with a first overlap.

5. The process according to claim 4, wherein the outer ring is elastically deformed as the stamp is press fitted into the outer ring.

6. The process according to claim 4, wherein the outer ring is pressed into the machine part with a second overlap which is at least 100 μm.

7. The process according to claim 4, wherein the outer ring is pressed into the machine part with a second overlap which corresponds to a maximum wall thickness eccentricity of the outer ring after the stamp has been press fit into the outer ring, plus at least 50 μm.

8. The process according to claim 1, wherein the machine part is pressed into a cylindrical bore of a matrix before the outer ring is press fitted into the machine part.

9. Process for mounting an inner ring of a bearing on a machine part, the inner ring having an outer peripheral surface with a raceway for rolling rollers or with a bearing surface, and an inner peripheral surface, the process comprising:
    pressing a stamp having a bore which possesses a shape onto the inner ring to deform the inner ring in such a way that the outer peripheral surface of the inner ring pressing against the stamp assumes the shape of the bore of the stamp;

pressing the inner ring onto a machine part through use of the stamp so that a contour of the inner peripheral surface of the inner ring is plastically molded into the machine part through axial flow forming of the machine part with the inner ring serving as a stretching tool; and removing the stamp from the inner ring.

10. The process according to claim 9, wherein the inner ring has a greater hardness than the machine part.

11. The process according to claim 9, wherein the outer peripheral surface of the inner ring substantially retains the shape formed with the stamp after the stamp is removed.

12. The process according to claim 9, wherein the stamp is pressed onto the inner ring with a first overlap.

13. The process according to claim 12, wherein the inner ring is elastically deformed as the stamp is pressed on.

14. The process according to claim 13, wherein the inner ring is pressed onto the machine part with a second overlap which is at least 100 μm.

15. The process according to claim 13, wherein the inner ring is pressed onto the machine part with a second overlap which corresponds to a maximum wall thickness eccentricity of the inner ring after the stamp has been press fit plus at least 50 μm.

* * * * *